(12) United States Patent
Wu et al.

(10) Patent No.: US 11,015,595 B2
(45) Date of Patent: May 25, 2021

(54) PISTON PUMP AND SEAL RING

(71) Applicant: Graco Minnesota Inc., Minneapolis, MN (US)

(72) Inventors: Xuishui Wu, Suzhou (CN); Zaixing You, Suzhou (CN); Ji Bao Wu, Suzhou (CN)

(73) Assignee: Graco Minnesota Inc., Minneapolis, MN (US)

( * ) Notice: Subject to any disclaimer, the term of this patent is extended or adjusted under 35 U.S.C. 154(b) by 244 days.

(21) Appl. No.: 16/313,658

(22) PCT Filed: Jun. 30, 2016

(86) PCT No.: PCT/CN2016/087888
§ 371 (c)(1),
(2) Date: Dec. 27, 2018

(87) PCT Pub. No.: WO2018/000323
PCT Pub. Date: Jan. 4, 2018

(65) Prior Publication Data
US 2019/0316582 A1    Oct. 17, 2019

(51) Int. Cl.
*F04B 53/12*    (2006.01)
*F04B 39/00*    (2006.01)
(Continued)

(52) U.S. Cl.
CPC ............ *F04B 53/122* (2013.01); *F04B 1/124* (2013.01); *F04B 9/133* (2013.01);
(Continued)

(58) Field of Classification Search
CPC .. F04B 53/122; F04B 39/0016; F04B 53/121; F04B 53/12; F04B 9/133; F04B 1/124
See application file for complete search history.

(56) References Cited

U.S. PATENT DOCUMENTS

| | | | |
|---|---|---|---|
| 61,209 A | * | 1/1867 | Kelly ................... F04B 53/122 417/513 |
| 1,254,024 A | | 1/1918 | Bryan |

(Continued)

FOREIGN PATENT DOCUMENTS

| CN | 101068624 A | 11/2007 |
|---|---|---|
| CN | 102428307 A | 4/2012 |

(Continued)

OTHER PUBLICATIONS

First Chinese Office Action for CN Application No. 201680087178.1, dated Oct. 22, 2019, pp. 6.

(Continued)

*Primary Examiner* — Peter J Bertheaud
(74) *Attorney, Agent, or Firm* — Kinney & Lange, P. A.

(57) ABSTRACT

A piston for a single-stroke pump includes a pump rod, a seal ring extending about the pump rod and having a central bore, and a retaining device disposed on the pump rod and retaining the seal ring on the pump rod. In a forward stroke, the seal ring is in a first position whereby the seal ring sealingly engages the pump rod such that the seal ring and pump rod drive a fluid out of the pump chamber. When transitioning to a return stroke, the seal ring is maintained stationary relative to the pump cylinder until retaining device engages seal ring, such that seal ring is in a second position. With the seal ring in the second position, a flow path is opened between the seal ring and the pump rod, allowing fluid to flow into the pump chamber to prime the pump the next pump cycle.

20 Claims, 5 Drawing Sheets

(51) Int. Cl.
*F04B 9/133* (2006.01)
*F04B 1/124* (2020.01)
*F04B 15/00* (2006.01)
*F04B 53/14* (2006.01)

(52) U.S. Cl.
CPC .......... *F04B 39/0016* (2013.01); *F04B 53/12* (2013.01); *F04B 53/121* (2013.01); *F04B 15/00* (2013.01); *F04B 53/143* (2013.01)

(56) References Cited

U.S. PATENT DOCUMENTS

| | | | |
|---|---|---|---|
| 3,176,595 A | | 4/1965 | Schwartz |
| 3,319,577 A | * | 5/1967 | Herreshoff ............ F04B 53/121 |
| | | | 417/511 |
| 3,558,244 A | * | 1/1971 | Uchiyama ............ F04B 53/164 |
| | | | 417/511 |
| 3,703,125 A | | 11/1972 | Pauliukonis |
| 3,901,313 A | * | 8/1975 | Doniguian ............ F04B 53/122 |
| | | | 166/64 |
| 4,591,316 A | * | 5/1986 | Vadasz Fekete ...... F04B 53/122 |
| | | | 417/259 |
| 5,083,499 A | * | 1/1992 | Elvingsson .......... B25D 11/125 |
| | | | 173/102 |
| 5,380,175 A | | 1/1995 | Amarume |

FOREIGN PATENT DOCUMENTS

| | | |
|---|---|---|
| CN | 102667150 A | 9/2012 |
| CN | 104728070 A | 6/2015 |
| CN | 204783624 U | 11/2015 |
| CN | 204941912 U | 1/2016 |
| IT | 477048 B | 6/1950 |
| WO | WO0063627 A2 | 10/2000 |
| WO | WO 2013078398 A1 | 5/2013 |

OTHER PUBLICATIONS

International Search Report and Written Opinion from PCT Application No. PCT/CN2016/087888, dated Mar. 30, 2017, 13 pages.
Extended European Search Report for EP Application No. 16906724.6, dated Feb. 11, 2020, pp. 9.

* cited by examiner

PISTON PUMP AND SEAL RING

CROSS-REFERENCE TO RELATED APPLICATION(S)

This application is a National Stage of PCT Application No. PCT/CN2016/087888 filed Jun. 30, 2016 for "PISTON PUMP AND SEAL RING", the disclosure of which is hereby incorporated by reference in its entirety.

BACKGROUND

Machinery often requires lubrication to function. Seals, pistons, bearings, and other parts require lubrication with small, measured amounts of grease or oil over short, frequent time intervals to prevent wear, corrosion, over-lubrication, or under-lubrication. Lubricant fluid is injected at specific locations that require lubrication by lubricant injectors. Lubricant fluid is drawn from a lubricant reservoir and pumped to the lubricant injectors via a lubrication line. The lubricant injectors are configured to inject a set, small amount of lubricant fluid to the specific location within the machinery once the pressure within the lubrication line reaches a predetermined level. After the lubricant injectors have dispensed the lubricant, the pressure within the lubrication line is relieved, thereby resetting the lubricant system for another lubrication cycle.

SUMMARY

According to an aspect of the present disclosure, a piston for a single-stroke pump includes a pump rod, a retaining device, and a seal ring. The pump rod has a first portion, a second portion, and a transition portion disposed between and connecting the first portion and the second portion, wherein the pump rod is positioned within a pump cylinder and wherein the first portion has a first diameter and the second portion has a second diameter and the first diameter is larger than the second diameter. The retaining device is connected to a distal end of the second portion, and the seal ring extends about the second portion between the first portion and the retaining device. The seal ring includes a cylindrical body extending between a first end and a second end and a bore extending through the cylindrical body from the first end to the second end and having a bore diameter. The bore diameter is less than the first diameter and greater than the second diameter. The seal ring is configured to be movable between a first position, where the first end of the seal ring sealingly abuts the transition portion of the pump rod such that the seal ring and the transition portion decrease a volume in a pump chamber during a forward stroke of the pump rod, and a second position, where the first end of the seal ring is disengaged from the transition portion such that a refill flowpath is opened through the bore during a return stroke of the pump rod.

According to another aspect of the present disclosure, a single-stoke pump includes a working cylinder, a pump cylinder, a reservoir, and outlet valve, and a piston. The working cylinder has a working fluid inlet, a working fluid outlet and a throat. The pump cylinder has an inlet end and an outlet end, and the inlet end is attached to the throat. The reservoir is fluidly connected to the pump cylinder and configured to store a pumped fluid. The outlet valve is connected to the outlet end of the pump cylinder. The piston includes a piston head, a pump rod extending from the piston head, a retaining device connected to a distal end of the pump rod, and a seal ring extending about the pump rod. The seal ring includes a body extending between a first end and a second end, and a bore extending through the body between the first end and the second end. The piston is disposed within the working fluid cylinder and extending into the pump cylinder through the throat. The piston head is disposed in the working fluid cylinder, and the pump rod extends from the piston head through the throat and into the pump cylinder. The pump cylinder defines a pump chamber extending between the seal ring and the outlet valve. A volume of the pump chamber decreases as the piston proceeds through a forward stroke and the volume of the pump chamber increases as the piston proceeds through a return stroke. The seal ring is configured be movable between a first position in which the seal ring sealingly engages the pump rod during the forward stroke to prevent fluid within pump cylinder from flowing around seal ring during the forward stroke, and a second position in which the seal ring is disengaged from the pump rod during the return stroke such that a refill flow path is opened through the bore to allow the pumped fluid from the reservoir to flow into the pump chamber.

According to yet another aspect of the present disclosure, A method of pumping includes driving a pump rod into a forward stroke through a pump cylinder, whereby a seal ring extends about the pump rod and provides a fluid tight seal between the pump rod and the pump cylinder to force fluid out of the pump cylinder during the forward stroke, and driving the pump rod in a return stroke in which the seal ring shifts to a second position abutting a retaining member and opening a flow path through which fluid flows from a reservoir and into a pump chamber during the return stroke.

DETAILED DESCRIPTION

Figure 1:
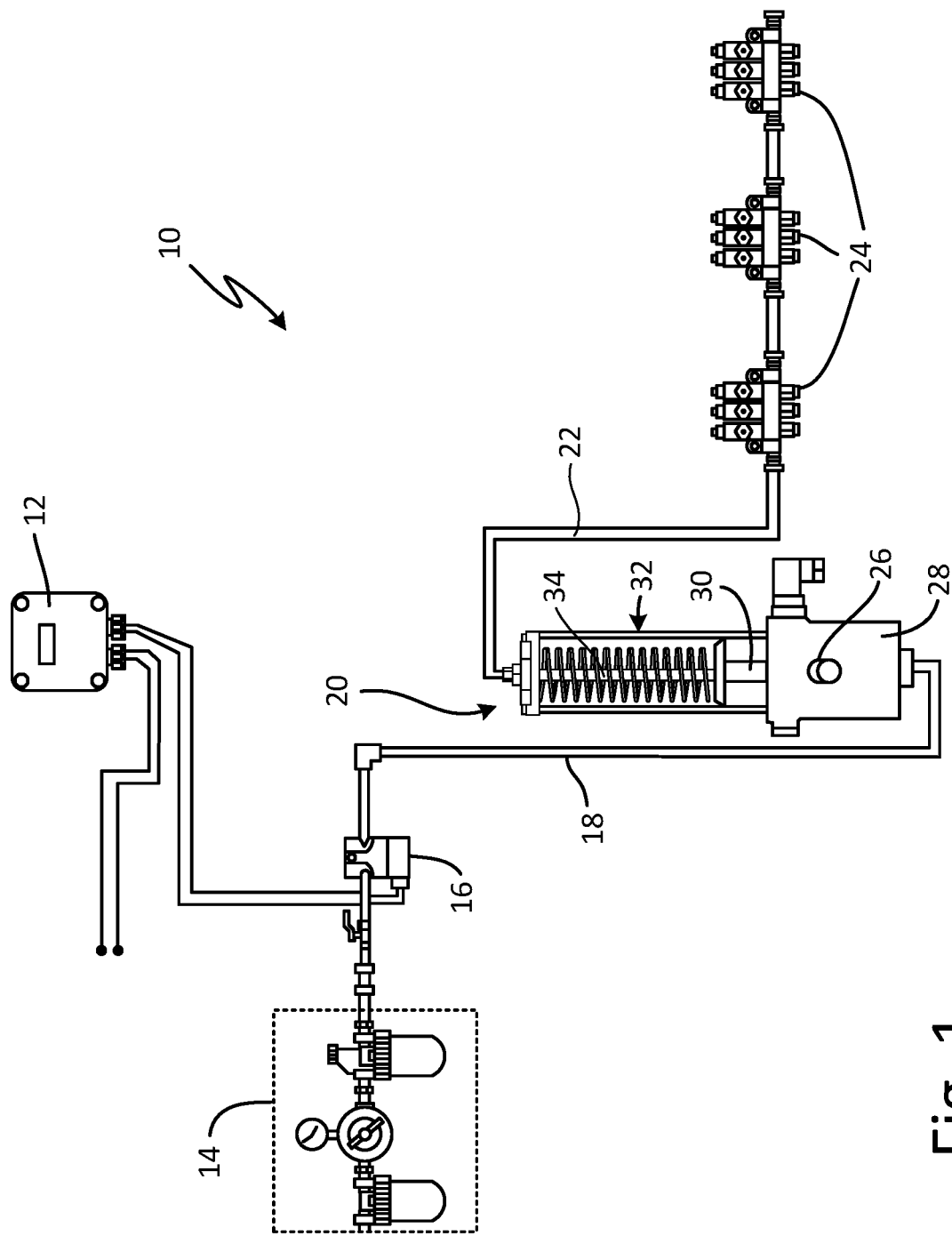
FIG. 1 is a schematic view of a lubrication system.

FIG. 1 is a schematic diagram of fluid system 10, which receives, stores, and supplies lubricant fluid. Fluid system 10 includes control 12, working fluid supply 14, valve 16, working fluid line 18, pump 20, application line 22, and injectors 24. Pump 20 includes refill inlet 26, working fluid cylinder 28, pump cylinder 30, reservoir 32, and outlet valve 34. Working fluid supply 14 is connected to valve 16. Valve 16 is connected to working fluid cylinder 28 through working fluid line 18. Working fluid cylinder 28 is secured to pump cylinder 30. Reservoir 32 is secured to working fluid cylinder 28 and pump cylinder 30 extends into reservoir 32. Refill inlet 26 extends into reservoir 32 to provide a fluid to reservoir 32. Outlet valve 34 is secured to pump cylinder 30 and extends through reservoir 32 to application line 22. Pump 20 is connected to injectors 24 by application line 22 extending from outlet valve 34.

Fluid system 10 is a system configured to pump a fluid downstream to injectors 24. For example, fluid system 10 may be a dedicated lubrication system for providing a lubricant, such as grease or oil, for use with lubricated machinery such as pumps, pistons, seals, bearings, and/or shafts. While fluid system 10 is described as providing fluid to injectors 24, it is understood that fluid system 10 may provide a fluid to any suitable downstream application that requires a pumped fluid. Injectors 24 may thus be a lubricant injector for applying the lubricant. Reservoir 32 stores fluid for distribution to downstream injectors 24. Pump 20 builds a pressure in application line 22 until the pressure reaches a pre-determined level. When the pressure in application line 22 reaches the pre-determined level the pressure causes the injectors 24 to dispense lubricant, thereby providing a set amount of lubricant to the machinery.

To build pressure in lubricant line 24, pump 20 is primed with fluid from reservoir 32. The fluid is stored within pump cylinder 30 until such time that the fluid is to be applied to injectors 24. To drive the fluid downstream from pump 20, working fluid supply 14 provides a working fluid, such as compressed air or hydraulic oil, to working fluid cylinder 28 through valve 16 and working fluid line 18. Control 12 commands valve 16 to actuate to a first position, whereby the working fluid is directed through working fluid line 18. The working fluid enters pump cylinder 30 and encounters a piston housed within working fluid cylinder 28, the working fluid drives the piston into a forward stroke. In the forward stroke the piston drives a piston rod through pump cylinder 30. The piston rod drives the lubricant from pump cylinder 30, through outlet valve 34, and into application line 22 thereby causing a pressure within application line 22 to build. The pressure continues to build within application line 22 as piston continues the forward stroke until the pressure reaches a level sufficient to cause injectors 24 to dispense the fluid.

After injectors 24 have dispensed the fluid, the pressure in application line 22 is relieved thereby allowing injectors 24 to reset. Control 12 commands valve 16 to shift to a second position, wherein valve 16 vents the working fluid from working fluid supply 14 through working fluid line 18. A return spring disposed within working fluid cylinder 28 drives the piston into a return stroke. During the return stroke, the piston pulls the piston rod back through pump cylinder 30, thereby reducing the pressure in pump cylinder 30 and drawing a portion of the fluid remaining in application line 22 back into pump cylinder 30 through outlet valve 34. The fluid flowing into pump cylinder 30 through outlet valve 34 allows the pressure in application line 22 to drop, thereby allowing injectors 24 to reset for another pump cycle. When the piston completes the return stroke, additional fluid in loaded into pump cylinder 30 from reservoir 32, thereby priming pump 20 for another pump cycle. While pump 20 is described as including a return spring to drive the piston into the return stroke, it is understood that fluid system 10 may include a second working fluid line extending between valve 16 and working fluid cylinder 28. The second working fluid line may provide a second portion of working fluid to an opposite side of the piston from working fluid line 18, thereby pushing the piston into a return stroke. While the second portion of working fluid is driving the piston into the return stroke, the first portion of working fluid is exhausted from working fluid cylinder 28 through first working fluid line 18 and valve 16.

After dispensing the fluid in reservoir 32, reservoir may be refilled by attaching a supply of fluid to be pumped to refill inlet 26. In addition, while reservoir 32 is described as being attached to working fluid cylinder 28, it is understood that reservoir 32 may be disposed within fluid system 10 in any suitable manner for providing lubricant to pump cylinder 30. For example, reservoir 32 may be disposed such that pump 20 is a horizontal pump or a vertical pump. Reservoir 32 may also be disposed remotely from pump cylinder 30 and attached to pump cylinder 30 with a refill line for priming pump cylinder 30 with additional lubricant during the return stroke.

Figure 2:
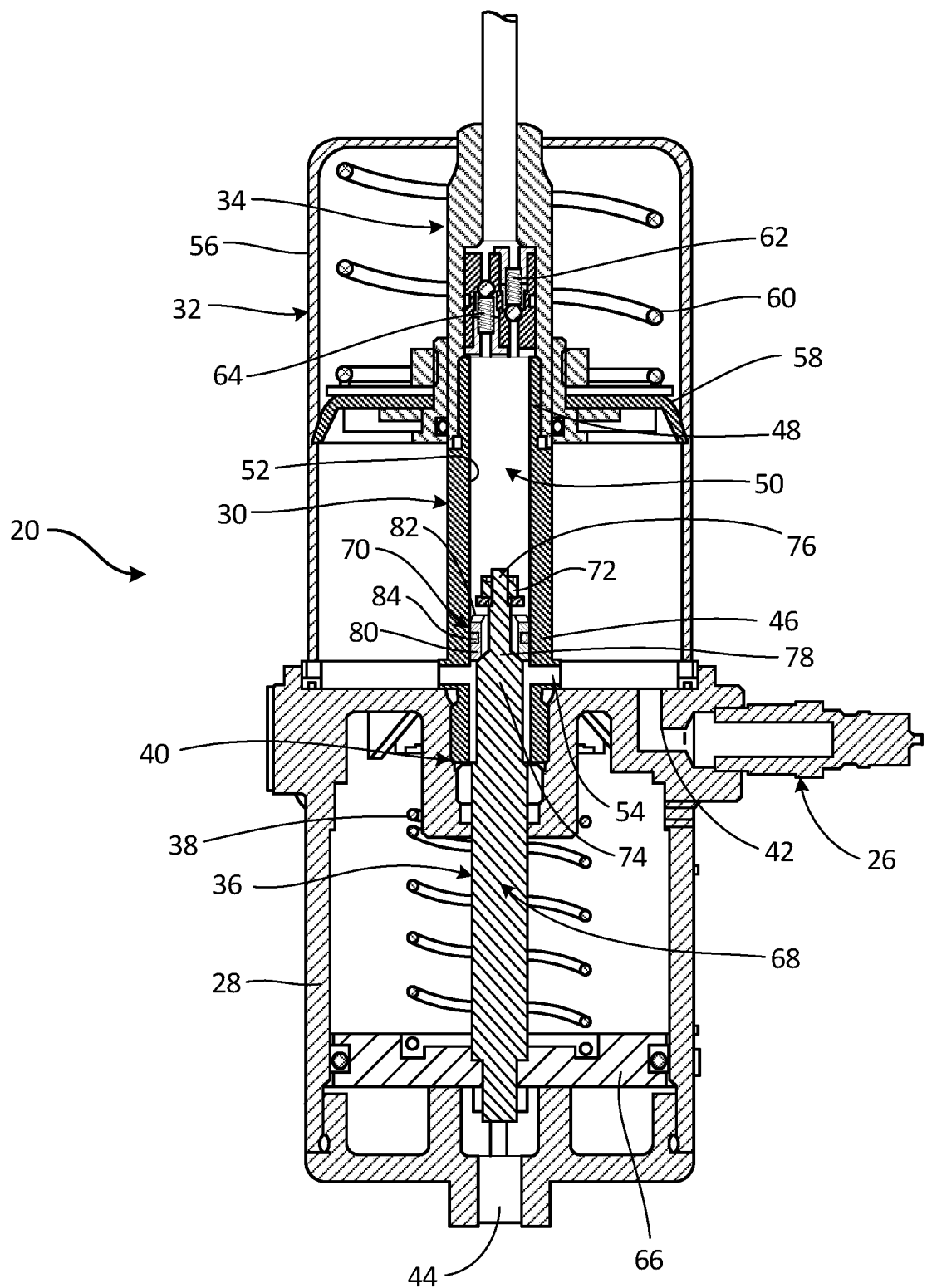
FIG. 2 is a cross-sectional view of a lubrication pump.

FIG. 2 is a cross-sectional view of pump 20. Pump 20 includes refill inlet 26, working fluid cylinder 28, pump cylinder 30, reservoir 32, outlet valve 34, piston 36, and return spring 38. Working pump cylinder 30 includes throat 40, load port 42, and working fluid inlet 44. Pump cylinder 30 includes inlet end 46, outlet end 48, pump chamber 50, inner wall 52, and fill port 54. Reservoir 32 includes reservoir housing 56, follower plate 58, and follower spring 60. Outlet valve 34 includes first one-way valve 62 and second one-way valve 64. Piston 36 includes piston head 66, pump rod 68, seal ring 70, and retaining device 72. Pump rod 68 includes first portion 74, second portion 76, and transition portion 78. Seal ring 70 includes first end 80, second end 82, and annular seal 84.

Working pump cylinder 30 is attached to reservoir housing 56. Inlet end 46 of pump cylinder 30 is secured within throat 40, and pump cylinder 30 extends from throat 40 and into reservoir housing 56. Pump cylinder 30 defines pump chamber 50 within inner wall 52 and between pump rod 68 and outlet valve 34. As such, a volume of pump chamber 50 decreases and increases as pump rod 68 proceeds through the forward stroke and the return stroke. Fill port 54 extends through inlet end 46 of pump cylinder 30 and is configured to allow fluid to flow from reservoir 32 into pump chamber 50 to refill pump chamber 50. Outlet valve 34 is attached to outlet end 48 of pump cylinder 30. Follower plate 58 extends about outlet valve 34 and pump cylinder 30 and is configured to slide relative to outlet valve 34 and pump cylinder 30 to follow a lubricant level within reservoir housing 56. Similar to follower plate 58, follower spring 60 extends about outlet valve 34 and pump cylinder 30. Follower spring 60 is configured to import a downward force on follower plate 58 to ensure that follower plate 58 follows a lubricant level within reservoir housing 56.

Piston 36 is disposed within working pump cylinder 30 and extends through throat 40 and into pump cylinder 30. Piston head 66 is disposed within working pump cylinder 30. Seal ring 70 extends about an outer circumference of piston head 66 and forms a seal with an inner wall of working pump cylinder 30. First portion 74 of pump rod 68 is attached to piston head 66 and extends through throat 40 and into pump cylinder 30. Transition portion 78 is disposed between and connects first portion 74 and second portion 76. Transition portion 78 is illustrated as a curved shoulder; it is understood, however, that transition portion 78 may be of any suitable form for forming a seat for seal ring 70 to engage during a forward stroke of pump rod 68. Second portion 76 of pump rod 68 extends from transition portion 78 and is disposed within pump chamber 50. Retaining device 72 is connected to a distal end of second portion 76, and is configured to retain seal ring 70 on second portion 76.

Seal ring 70 is disposed on second portion 76 between transition portion 78 and retaining device 72, such that second portion 76 extends through seal ring 70. Annular seal 84 extends seal ring 70 and forms a seal between seal ring 70 and inner wall 52 of pump cylinder 30. Seal ring 70 is configured to be positioned between a first position, where seal ring 70 abuts transition portion 78 and forms a seal, and a second position, where seal ring 70 abuts retaining device 72 and opens a refill flow path through bore 88. Annular seal 84 creates a seal between seal ring 70 and inner wall 52 of pump cylinder 30 to prevent fluid from flowing about seal ring 70 as pump rod 68 is driven through the forward stroke.

During operation, pump 20 drives a fluid downstream from pump chamber 50, through outlet valve 34, and to injectors 24 (shown in FIG. 1). To drive the fluid downstream, working fluid is provided to working pump cylinder 30 through working fluid inlet 44. The working fluid encounters piston head 66 and seal ring 70, and seal ring 70 prevents the working fluid from flowing around piston head 66. As such, the working fluid drives piston 36 into a forward stroke. Piston head 66 simultaneously drives pump rod 68 into a forward stroke through the connection of first portion 74 and piston head 66. As pump rod 68 proceeds through the forward stroke, transition portion 78 engages first end 80 of seal ring 70 and drives seal ring 70 into the forward stroke. The engagement of seal ring 70 and transition portion 78 and the seal formed by annular seal 84 and inner wall 52 prevent the fluid disposed within pump chamber 50 from flowing around seal ring 70 and pump rod 68 as piston 36 proceeds through the forward stroke. As such, seal ring 70 and pump rod 68 decrease the volume of pump chamber 50 as seal ring 70 and pump rod 68 are driven though pump chamber 50. Decreasing the volume of pump chamber 50 simultaneously increases a pressure within pump chamber 50. The pressure within pump chamber 50 builds until the pressure reaches a sufficient level to cause first one-way valve 62 to open. When first one-way valve 62 opens, the fluid flows downstream from pump chamber 50 through outlet valve 34 and to application line 22.

After completing the forward stroke, the working fluid is vented from working fluid cylinder, and return spring 38 drives piston 36 into a return stroke. While piston 36 is described as being driven into the return stroke by return spring 38, it is understood that working pump cylinder 30 may include an additional working fluid inlet extending through working fluid cylinder on an opposite side of piston head 66 from working fluid inlet 44. The additional working fluid inlet may introduce working fluid to working pump chamber 50 to drive piston 36 into the return stroke.

As piston 36 changes over to the return stroke, pump rod 68 begins to shift back towards inlet end 46 of pump cylinder 30. As pump rod 68 proceeds through the return stroke, first one-way valve 62 closes and a volume of pump chamber 50 increases. The closure of outlet valve 34 and the increasing volume of pump chamber 50 causes a negative pressure to build within pump chamber 50. The negative pressure within pump chamber 50 and the friction between annular seal 84 and inner wall 52 of pump cylinder 30 causes seal ring 70 to remain stationary relative to pump rod 68 as pump rod 68 changes over to the return stroke. Seal ring 70 remains stationary until retaining device 72 engages second end of seal ring 70, thereby placing seal ring 70 in the second position. With seal ring 70 in the second position, a refill flow path is opened through seal ring 70 between seal ring 70 and second portion 76. With the refill flow path opened, fluid flows from reservoir housing 56, through fill ports 54 and seal ring 70, and into pump chamber 50. In this way, pump chamber 50 is refilled with fluid and pump 20 is primed for another pump cycle.

Figure 3A:
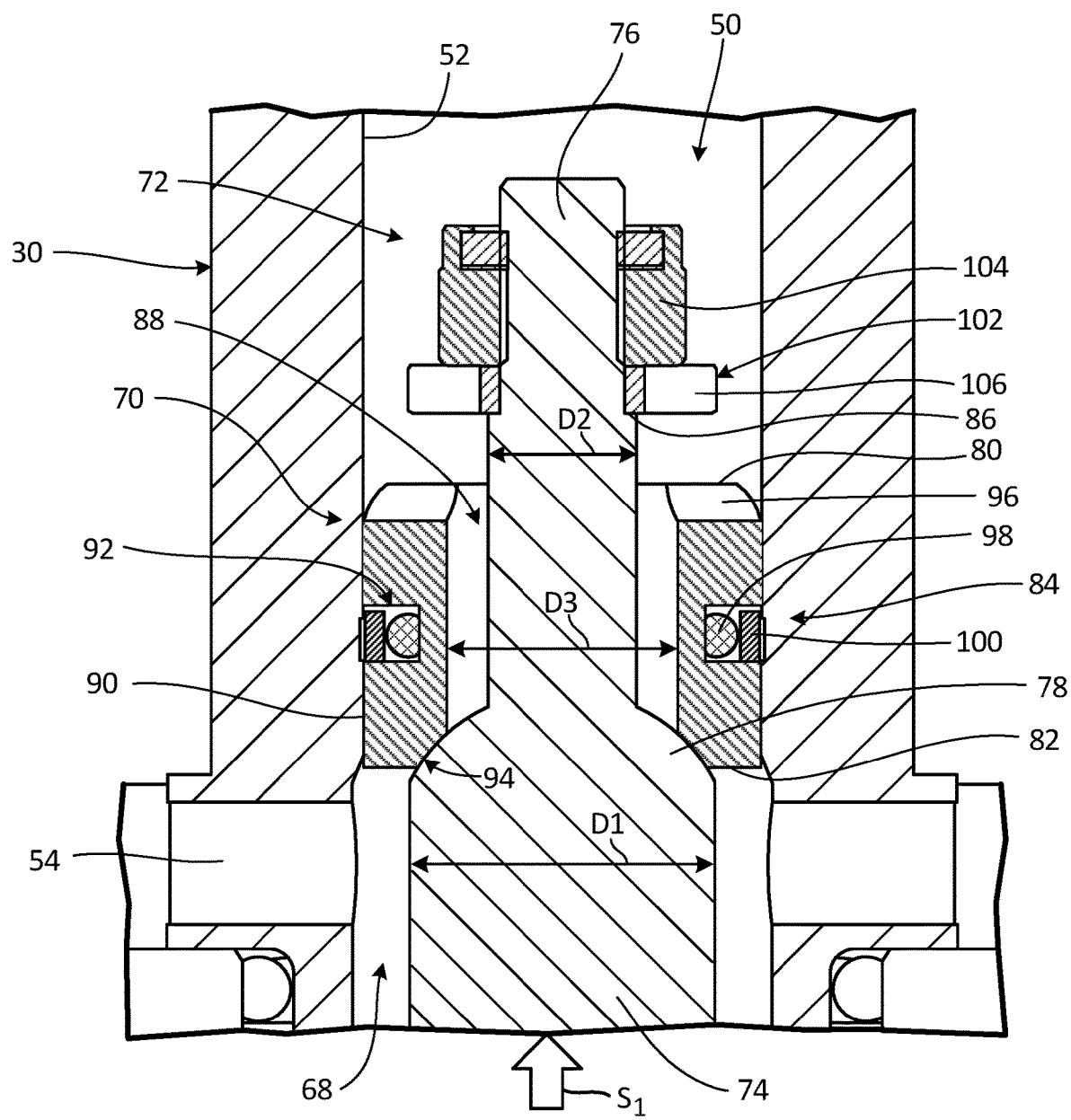
FIG. 3A is a cross-sectional view of a fluid chamber showing a seal ring in a first position during a forward (pumping) stroke.
Figure 3B:
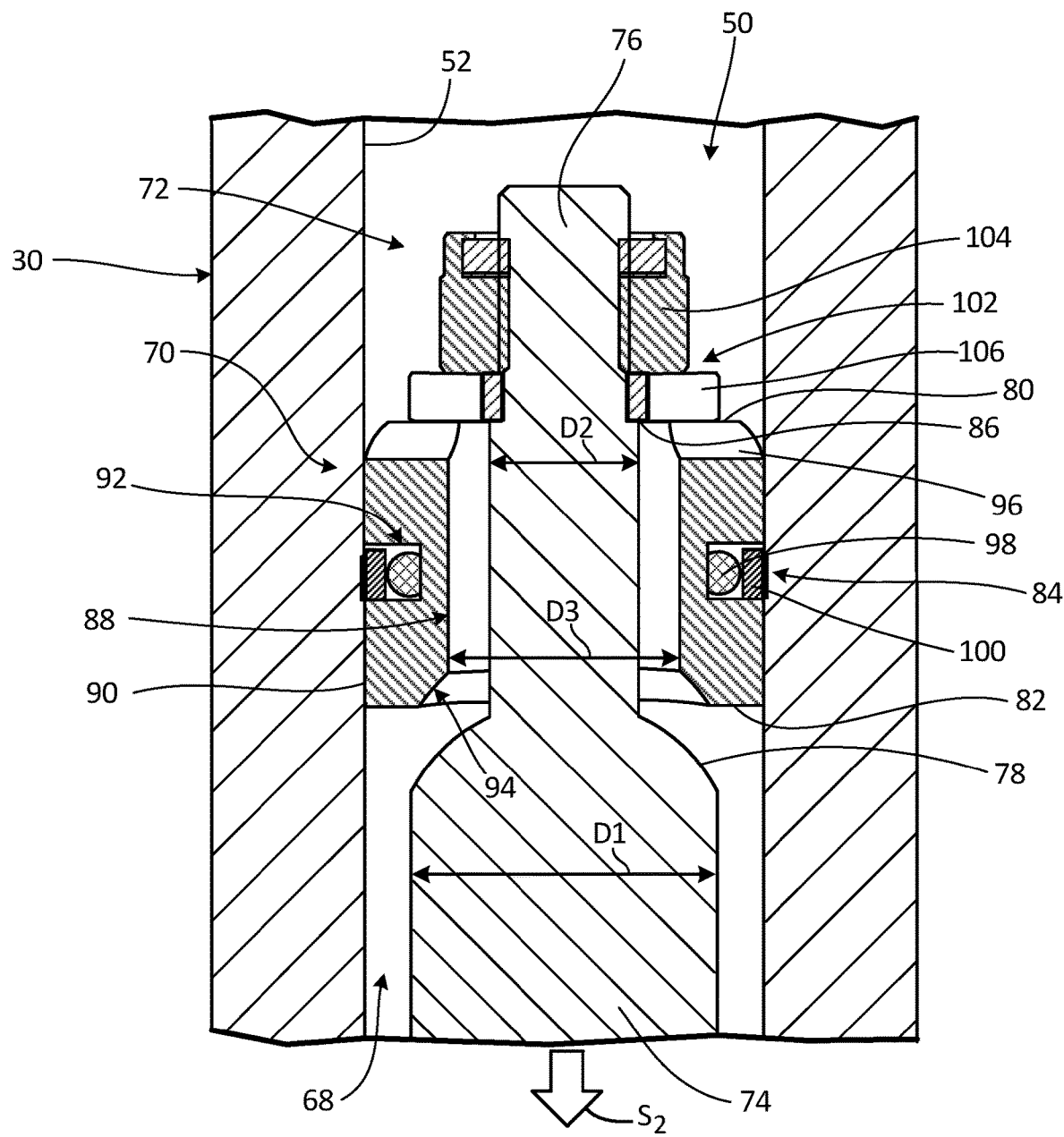
FIG. 3B is a cross-sectional view of a fluid chamber showing a seal ring in a second position during a return (filling) stroke.

FIG. 3A is a cross-sectional view of seal ring 70 in the first position in which seal ring 70 engages transition portion 78 of pump rod 68. FIG. 3B is a cross-sectional view of seal ring 70 in the second position in which seal ring 70 engages retaining device 72. FIGS. 3A and 3B are substantially similar and will be discussed together. Pump cylinder 30 defines pump chamber 50 and includes inner wall 52 and fill ports 54. Pump rod 68 includes first portion 74, second portion 76, and transition portion 78. Second portion 76 includes shoulder 86. Seal ring 70 includes first end 80, second end 82, annular seal 84, bore 88, outer wall 90, and annular groove 92. First end 80 includes annular mate face 94. Second end 82 includes cutouts 96. Annular seal 84 includes o-ring 98 and slipper seal 100. Retaining device 72 includes washer 102 and nut 104. Washer 102 includes projections 106.

First portion 74 of pump rod 68 extends into pump chamber 50. Transition portion 78 extends between and connects first portion 74 and second portion 76, and second portion 76 extends from transition portion 78 and into pump chamber 50. First portion 74 has an outer diameter D1 and second portion has an outer diameter D2, and diameter D1 is larger than diameter D2 with transition portion 78 transitioning between diameter D1 and diameter D2. Retaining device 72 is secured to pump rod 68 proximate a distal end of second portion 76. Washer 102 is disposed on second portion 76 and rests on shoulder 86. Nut 104 is secured to second portion 76 and retains washer 102 against shoulder 86.

Seal ring 70 is disposed about second portion 76 of pump rod 68 between transition portion 78 and retaining device 72. Second portion 76 extends through bore 88 such that a gap is disposed between an inner surface of seal ring 70 and an outer surface of second portion 76. Bore 88 has an inner diameter D3, which is preferably larger than diameter D2 such that a refill flow path is defined in the annular gap defined by the difference between diameter D3 and diameter D2. Annular groove 92 extends about an outer surface of seal ring 70, and annular seal 84 is disposed within annular groove 92. Annular seal 84 forms a seal between seal ring 70 and the inner wall of pump cylinder 30. Slipper seal 100 is disposed within annular groove 92 and abuts inner wall 52 of pump cylinder 30. O-ring 98 is disposed within annular groove 92 between seal ring 70 and slipper seal 100. O-ring 98 is preferably an energizing o-ring such that o-ring 98 forces slipper seal 100 radially outward to ensure that slipper seal 100 maintains a sealing connection with inner wall 52 of pump cylinder 30. While annular seal 84 is described as including o-ring 98 and slipper seal 100, it is understood that annular seal 84 may be of any suitable configuration for providing a seal between seal ring 70 and pump cylinder 30, while allowing seal ring 70 to shift between the first position and the second position. For example, seal ring 70 may be a monolithic seal. Slipper seal 100 may be made from any suitable material to allow slipper seal 100 to smoothly slide along inner wall 52 of pump cylinder 30. For example, slipper seal 100 may be made of polytetrafluoroethylene (PTFE) or any other suitable material.

Annular mate face 94 extends about first end 80 of seal ring 70 adjacent bore 88. Annular mate face 94 is configured to engage transition portion 78 and form a fluid-tight seal when seal ring 70 is in the first position. Transition portion 78 is illustrated as a curved shoulder and annular mate face 94 is correspondingly illustrated as a curved surface; it is understood, however, that transition portion 78 and annular mate face 94 may be of any suitable configuration for forming a seal to prevent fluid from flowing past pump rod 68 and seal ring 70 when seal ring is in the first position. For example, annular mate face 94 may include a squared recess and transition portion 78 may include a squared projection or annular mate face 94 may include a conical recess and transition portion 78 may include a conical projection.

In FIG. 3A, seal ring 70 is in the first position with annular mate face 94 abutting transition portion 78. With seal ring 70 in the first position, annular mate face 94 forms a seal with transition portion 78 to prevent fluid from flowing through bore 88. Annular seal 84 forms a seal with inner wall 52 of pump cylinder 30 to prevent fluid from flowing around outer wall 90 of seal ring 70. Annular seal 84 also allows seal ring 70 to easily slide along inner wall 52 of pump cylinder 30 as pump rod 68 moves through the forward stroke and the return stroke, while maintaining a seal with inner wall 52 of pump cylinder 30.

Pump cylinder 30 is primed for a pump cycle when pump chamber 50 is filled with a fluid to be pumped. When the pump cycle begins, pump rod 68 is driven into the forward stroke, indicated by arrow S1. The seals formed between annular mate face 94 and transition portion 70 and between annular seal 84 and inner wall 52 prevent fluid from flowing around seal ring 70 as pump rod 68 and seal ring 70 proceed through pump chamber 50. Pump rod 68 and seal ring 70 moving through pump chamber 50 decreases the volume of pump chamber 50, thereby increasing a lubricant pressure within pump chamber 50. The lubricant pressure continues to build until first one-way valve 62 (shown in FIG. 2A) opens, and the lubricant then proceeds downstream through outlet valve 34 (shown in FIG. 2A).

After the fluid is distributed downstream from pump chamber 50, pump rod 68 changes-over from the forward stroke to a return stroke. As pump rod 68 transitions to the return stroke, the engagement of slipper seal 100 with the inner wall of pump cylinder 30 creates a friction that causes seal ring 70 to remain stationary relative to inner wall 52 as pump rod 68 moves in the return stroke. In addition, pump rod 68 transitioning to the return stroke causes first one-way valve 62 to close, which causes a negative pressure to build within pump chamber 50 due to the volume of pump chamber 50 increasing as pump rod 68 moves through the return stroke. The negative pressure, in addition to the friction between slipper seal 100 and the inner wall of pump cylinder 30, further maintains seal ring 70 stationary relative to pump cylinder 30. Seal ring 70 remains stationary until washer 102 engages second end 82 of seal ring 70. Washer 102 engages seal ring 70 and pulls seal ring 70 is through the return stroke.

In FIG. 3B, seal ring 70 is in the second position with second end 82 abutting washer 102. With seal ring 70 in the second position, a refill flow path is opened through bore 88 and washer 102. The refill flow path allows lubricant to flow into pump chamber 50 to prime pump 20 (best seen in FIG. 2) as pump rod 68 proceeds through the return stroke, indicated by arrow S2. With seal ring 70 in the second position, washer 102 abuts second end 82 of seal ring 70, and washer 102 pulls seal ring 70 through the return stroke such that seal ring 70 is in the second position throughout the return stroke. Cutouts 96 extend about second end 82 of seal ring 70. Projections 106 extend radially from washer 102 and are configured to engage second end 82 to retain seal ring 70.

With seal ring 70 in the second position, the refill flow path allows fluid to flow into pump chamber 50. The negative pressure created within pump chamber 50 draws fluid into pump chamber 50. The fluid enters pump cylinder 30 through fill ports 54. The fluid flows through the refill flow path extending through bore 88 between bore 88 and second portion 76. With second end 82 abutting washer 102, the fluid flows into pump chamber 50 by flowing through cutouts 96 and between projections 106 extending from washer 102. While second end 82 of seal ring 70 is described as including cutouts 96 to allow for pump cylinder 30 to be refilled, it is understood that seal ring 70 may include any suitable feature, or no additional feature, to allow for pump chamber 50 to be refilled through bore 88. For example, seal ring 70 may include a bore extending through the wall of the seal ring 70, may include an inclined edge on second end 82, may include a scalloped second end 82, or may include any other additional features. In addition, washer 102 is shown as a star washer, including projections 106 extending about a circumference of washer 102, but it is understood that washer may be any suitable device for limiting a displacement of seal ring 70 and for allowing fluid to flow past washer 102 and into pump chamber 50 to refill pump chamber 50 when seal ring 70 is in the second position. For example, washer 102 may be a disc, a perforated disc, include a scalloped edge, or be of any other suitable configuration.

The pump rod 68 continues to pull seal ring 70 as pump rod 68 moves through the return stroke until pump rod 68 returns to the primed position. With pump rod 68 back in the primed position, pump chamber 50 is filled with fluid and seal ring 70 may be disposed in the first position, the second position, or any intermediate position disposed there between. When the next pump cycle begins, transition portion 78 engages annular mate face 94 and seal ring 50 is again disposed in the first position.

Seal ring 70 is movable between the first position, whereby seal ring 70 forms a seal with transition portion 78, and the second position, whereby seal ring 70 provides a flow path through bore 88 to refill pump chamber 50 such that lubricant pump 20 (shown in FIG. 2) is primed for the next lubrication cycle. Annular seal ring 70 creates less friction when sliding along the inner wall of pump cylinder 30 than a machine-honed interface, thereby leading to a longer and more stable lifespan. Moreover, using seal ring 70 reduces manufacturing time as pump cylinder 30 and pump rod 68 do not need to be machine-honed. Seal ring 70 also generates less pressure decay and provides a greater output and ratio than machine-honed interfaces. Seal ring 70 additionally allows for a longer effective stroke length of pump rod 68, as seal ring 70 both forms a seal when in the first position to increase pressure in pump chamber 50 and opens a flow path through bore 88 when in the second position to allow pump chamber 30 to be refilled.

Figure 4:
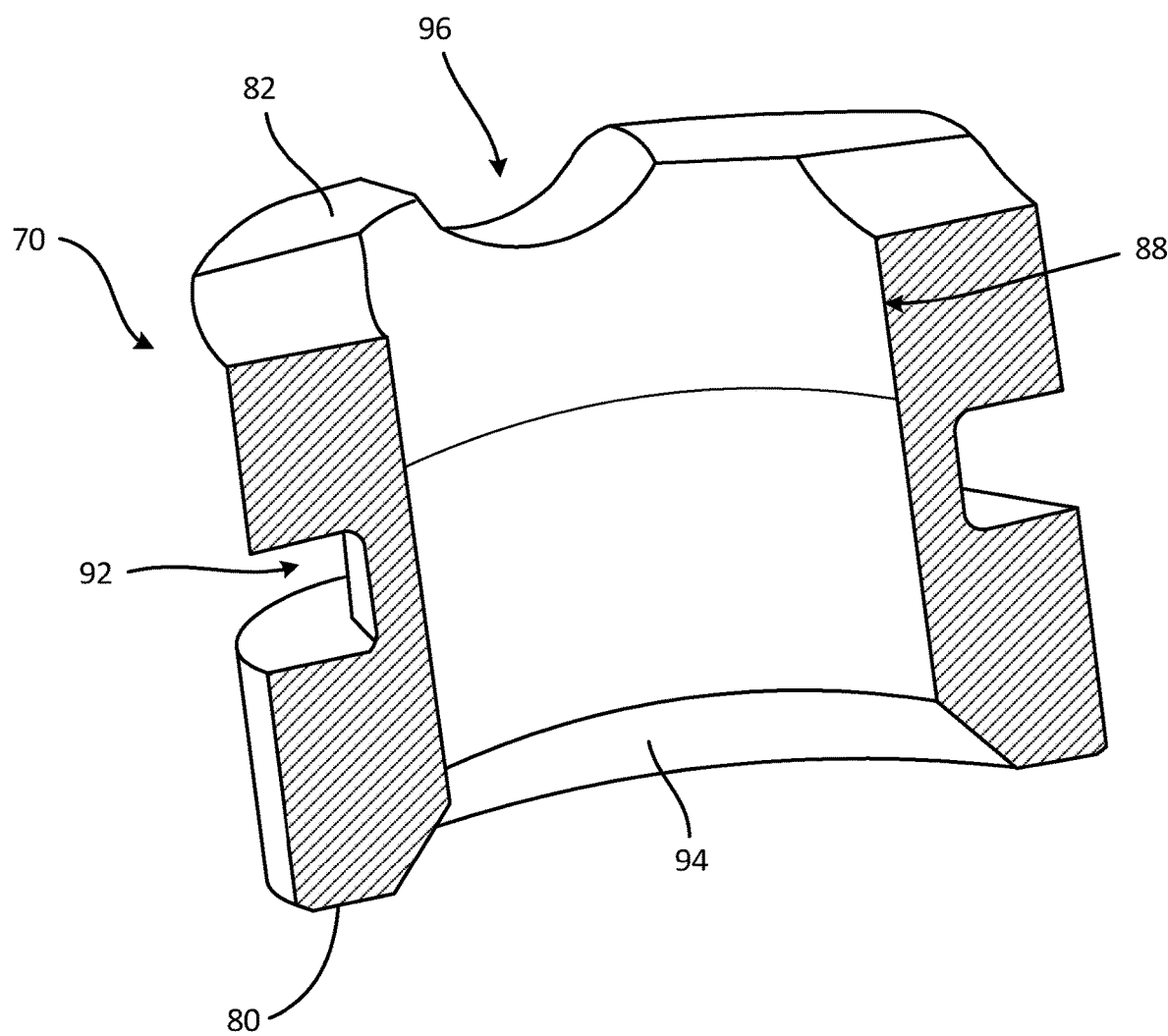
FIG. 4 is an isometric, cross-sectional view of a seal ring.

FIG. 4 is an isometric, cross-sectional view of seal ring 70. Seal ring 70 includes first end 80, second end 82, bore 88, and annular groove 92. First end 80 includes annular mate face 94. Second end 82 includes cutouts 96. First end 80 is disposed opposite second end 82. A body of seal ring 70 extends between first end 80 and second end 82, and annular groove 92 extends into the body about an exterior wall of the body. Annular groove 92 is configured to receive an annular seal, such as annular seal 84 described above. Bore 88 extends through the body between first end 80 and second end 82. Annular mate face 94 extends circumferentially about first end 80 and extends from bore 88 to first end 80. Cutouts 96 extend about second end 82 and are configured to allow lubricant to flow out of bore 88 around second end 82.

Bore 88 extends through seal ring 70 between first end 80 and second end 82 and is configured to provide a flow path through seal ring 70 for lubricant. Bore 88 is further configured to receive second portion 76 (best seen in FIGS. 3A and 3B) and to surround second portion 76 while maintaining a gap between seal ring 70 and second portion 76. Cutouts 96 allow lubricant flowing through the flow path defined by bore 88 to exit seal ring 70 and flow into pump chamber 50 (best seen in FIG. 2A). In this way, cutouts 96 allow for pump chamber 50 to be easily refilled by flowing lubricant through bore 88. Annular mate face 94 is disposed on first end 80 and is configured to engage a surface, such as transition portion 78 (best seen in FIG. 3A), to form a seal to prevent lubricant from flowing through the flow path. Seal ring 70 may be made from any material with suitable mechanical and chemical resistance for pumping a fluid, such as thermoplastic. For example, seal ring 70 may be made of polyether ether ketone.

Seal ring 70 provides significant advantages. Seal ring 70 eliminates the need to precisely hone a pump rod and a pump cylinder to allow the pump rod to decrease a volume within a pump chamber in the pump cylinder during a forward stroke. Instead, first end 80 of seal ring 70 is forced onto transition portion 78 (best seen in FIG. 3A) by the forward stroke to form a seal that does not require machine-honing Eliminating the machine-honing of the pump cylinder and the pump rod both eases the difficulty of manufacturing and reduces manufacturing costs.

Although the present invention has been described with reference to preferred embodiments, workers skilled in the art will recognize that changes may be made in form and detail without departing from the spirit and scope of the invention.

The invention claimed is:

1. A piston for a pump, the piston configured to reciprocate on an axis to pump fluid, the piston comprising:
   a pump rod axially elongate between a first axial end and a second axial end, the pump rod comprising:
      a first cylindrical portion elongate along the axis and extending in a first axial direction from the first axial end;
      a second cylindrical portion extending in the first axial direction from the first cylindrical portion to the second axial end, the second cylindrical portion having a shorter length than the first cylindrical portion; and
      a transition portion connecting the first portion and the second portion;
      wherein the first cylindrical portion has a first diameter and the second cylindrical portion has a second diameter and the first diameter is larger than the second diameter, and
      wherein the transition portion is a curved shoulder extending axially between and connecting the first cylindrical portion and the second cylindrical portion such that a diameter of the pump rod changes along the transition portion between the first diameter and the second diameter;
   a retaining device connected to the second cylindrical portion at a distal end of the second cylindrical portion such that the transition portion and at least a part of the second cylindrical portion are disposed axially between the first cylindrical portion and the retaining device; and
   a seal ring extending about the second cylindrical portion and disposed between the first cylindrical portion and the retaining device, wherein the seal ring comprises:
      a cylindrical body extending between a first ring end and a second ring end; and
      a bore extending through the cylindrical body from the first ring end to the second ring end and having a bore diameter;
      wherein the bore diameter is less than the first diameter and greater than the second diameter;
      wherein the seal ring is configured to be movable between a first position, in which the first ring end of the seal ring sealingly abuts the transition portion of the pump rod during a forward stroke of the pump rod, and a second position, in which the second ring end of the seal ring engages the retaining device such that a refill flowpath is opened through the bore during a return stroke of the pump rod.

2. The piston of claim 1, wherein the first ring end of the seal ring further comprises:
   an annular mate face extending about the first ring end, wherein the annular mate face is configured to sealingly mate with the transition portion when the seal ring is in the first position.

3. The piston of claim 1, wherein the second ring end of the seal ring further comprises:
   at least one cutout configured to provide a flow path between the second ring end and the retaining device when the seal ring is in the second position.

4. The piston of claim 1, wherein the seal ring further comprises:
   an annular groove extending into an outer surface of the body of the seal ring; and
   an annular seal disposed within the annular groove.

5. The piston of claim 4, wherein the annular seal further comprises:
   an o-ring disposed within the annular groove; and
   a slipper seal disposed within the annular groove;
   wherein the o-ring is disposed between the slipper seal and the body of the seal ring.

6. The piston of claim 5, wherein the slipper seal comprises polytetrafluoroethylene.

7. The piston of claim 1, wherein the seal ring comprises polyether ether ketone.

8. The piston of claim 1, wherein the retaining device further comprises:
   a washer disposed on the second cylindrical portion; and
   a nut disposed on the second cylindrical portion and retaining the washer on the second cylindrical portion.

9. The piston of claim 8, wherein the washer comprises a star washer.

10. A single-stoke pump comprising:
   a working cylinder having a working fluid inlet, a working fluid outlet, and a throat;
   a pump cylinder having an inlet end and an outlet end, wherein the inlet end is attached to the throat;
   a reservoir fluidly connected to the pump cylinder and configured to store a pumped fluid and to provide the pumped fluid to the pump cylinder;
   an outlet valve connected to the outlet end of the pump cylinder; and
   a piston disposed within the working fluid cylinder and extending into the pump cylinder through the throat, wherein the piston comprises:
      a piston head disposed within the working fluid cylinder;
      a pump rod extending from the piston head through the throat and into the pump cylinder, wherein the pump rod comprises:
         a first portion attached to the piston head and extending through the throat and into the pump cylinder and having a first diameter;
         a second portion extending from the first portion into the pump chamber and having a second diameter, wherein the second diameter is smaller than the first diameter;
      a retaining device connected to a distal end of the pump rod; and
      a seal ring extending about the second portion of the pump rod and disposed within the pump cylinder, wherein the seal ring comprises:

a body extending between a first end and a second end; and a bore extending through the body between the first end and the second end;

wherein a bore diameter of the bore is less than the first diameter and greater than the second diameter;

wherein the pump cylinder defines a pump chamber extending between the seal ring and the outlet valve, wherein a volume of the pump chamber decreases as the piston proceeds through a forward stroke and increases as the piston proceeds through a return stroke; and wherein the seal ring is configured to be movable between a first position in which the seal ring sealingly engages a portion of the pump rod at a transition between the first diameter of the first portion to the second diameter of the second portion during the forward stroke to prevent fluid within pump cylinder from flowing around seal ring during the forward stroke, and a second position in which the seal ring is disengaged from the pump rod during the return stroke such that a refill flow path is opened through the bore to allow the pumped fluid from the reservoir to flow into the pump chamber.

11. The single-stroke pump of claim 10, wherein the first end of the seal ring is configured to sealingly engage a shoulder of the pump rod when the seal ring is in the first position.

12. The single-stroke pump of claim 10, and further comprising:

a transition portion extending between and connecting the first portion and the second portion, wherein the transition portion comprises a curved shoulder; and an annular mate face disposed on the seal ring and extending between the first end and the bore, wherein the annular mate face is configured to sealingly engage the transition portion when the seal ring is in the first position.

13. The single-stroke pump of claim 10, wherein the seal ring further comprises:

at least one cutout extending into the second end, wherein the cutout is configured to provide a flow path between the second end and the retaining device when the seal ring is in the second position.

14. The single-stroke pump of claim 10, wherein the seal ring further comprises:

an annular groove extending into an outer edge of the body; and an annular seal disposed within the annular groove.

15. The single-stroke pump of claim 14, wherein the annular seal comprises:

an o-ring disposed within the annular groove; and a slipper seal disposed within the annular groove;

wherein the o-ring is disposed between the slipper seal and the body.

16. The single-stroke pump of claim 10, wherein the retaining device comprises:

a washer disposed on the second portion; and a nut disposed on the second portion and retaining the washer on the second portion;

wherein the washer abuts the second end of the seal ring when the seal ring is in the second position.

17. A method of pumping with a single-stroke pump having a pump cylinder connected to a working fluid cylinder, a reservoir connected to the pump cylinder to provide fluid to the pump cylinder for pumping, an outlet valve connected to an outlet end of the pump cylinder, and a piston disposed partially within the working fluid cylinder and extending through a throat of the working fluid cylinder into the pump cylinder, the method comprising:

driving a pump rod of the piston, using a piston head disposed in the working fluid cylinder, into a forward stroke through the pump cylinder, wherein the pump rod includes a first portion attached to the piston head disposed in the working fluid cylinder, the first portion extending through the throat and into the pump cylinder, and the first portion having a first diameter, and wherein the pump rod includes a second portion extending from the first portion into the pump chamber, the second portion having a second diameter, wherein the second diameter is smaller than the first diameter;

forcing fluid out of the pump cylinder during the forward stroke using a seal ring, wherein the seal ring includes a body extending between a first end and a second end and a bore though the body between the first end and the second end extends about the pump rod and provides a fluid tight seal between the pump rod and the pump cylinder; the seal ring being disposed about the second portion and engaging and sealing against a portion of the pump rod at a transition between the first diameter of the first portion to the second diameter of the second portion during the forward stroke, and wherein a bore diameter of a bore through the seal ring is less than the first diameter and greater than the second diameter; and driving the pump rod in a return stroke in which the seal ring shifts to a second position abutting a retaining member and opening a flow path through the bore of the seal ring and through which fluid flows from a reservoir and into the pump cylinder defined between the seal ring and the outlet valve.

18. The method of claim 17, wherein driving the pump rod in the return stroke in which the seal ring shifts to the second position abutting the retaining member and opening the flow path through which fluid flows from the reservoir and into the pump chamber during the return stroke further comprises:

flowing the fluid into the pump cylinder through a fill port in the pump cylinder; and flowing the fluid through a bore extending though the seal ring, wherein the pump rod extends through the bore such that the fluid flows between the pump rod and the seal ring.

19. The method of claim 18, and further comprising:

flowing the fluid through a cutout extending into an end of the seal ring, wherein the cutout is disposed adjacent a retaining device connected to a distal end of the pump rod when the seal ring is in the second position.

20. The method of claim 17, wherein driving the pump rod in the return stroke in which the seal ring shifts to the second position abutting the retaining member and opening the flow path through which fluid flows from the reservoir and into the pump chamber during the return stroke further comprises:

maintaining a position of the seal ring relative to the fluid chamber as the pump rod transitions to the return stroke;

engaging the seal ring with the retaining member connected to a distal end of the pump rod; and pulling the seal ring through the return stroke with the retaining member.

* * * * *